3,057,390
BLENDS OF UNVULCANIZED BUTYL RUBBER AND VULCANIZED HALOGENATED BUTYL RUBBER AND TIRES COMPRISING SAID BLEND
Hubert A. Pattison, Jr., Elizabeth, and John R. Briggs, Westfield, N.J., assignors to Esso Research and Engineering Company, a corporation of Delaware
Filed Oct. 8, 1959, Ser. No. 845,226
12 Claims. (Cl. 152—330)

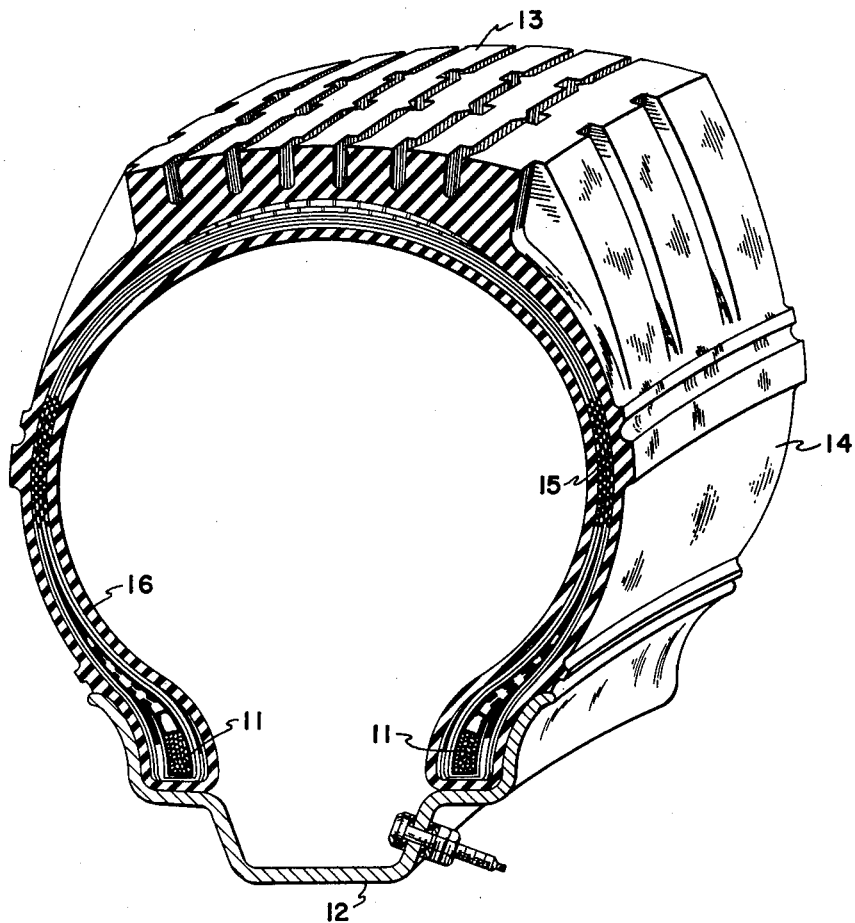
Hubert A. Pattison, Jr.
John R. Briggs     Inventors
By  C. D. Stores    Patent Attorney United States Patent Office 3,057,390
Patented Oct. 9, 1962

This invention relates to a method for increasing the wear resistance of a rubbery polymer and more particularly it relates to the improved vulcanizate and tire therefrom.

It is known to mix a major proportion of unvulcanized butyl rubber with a minor proportion of vulcanized butyl rubber scrap and to subsequently cure this admixture to produce a unitary vulcanizate (U.S. Patent No. 2,884,-982). In the past, however, even the method of using unreclaimed comminuted vulcanized butyl rubber scrap with unvulcanized butyl rubber has provided a vulcanizate in which the wear resistance is still relatively low for certain commercial aspects. This is manifest in the tire industry where high resistance to wearing is a paramount characteristic.

It has now been discovered that the wear resistance of a vulcanizate can be substantially increased by incorporating unreclaimed comminuted vulcanized halogenated butyl rubber scrap in an unvulcanized butyl rubber. Thus, in accordance with one embodiment of this invention, a copolymer of an isoolefin with a multiolefin is prepared and subsequently mixed with a minor proportion of halogenated butyl rubber scrap in conjunction with other compounding ingredients. This compounded admixture is then heated in the presence of curatives at elevated temperatures to provide a vulcanizate therefrom with improved wear resistance.

The butyl rubber polymer in this invention is prepared by reacting 70 to 99.5 parts by weight, preferably 85 to 99.5, of an isoolefin with 30 to 0.5 parts by weight, preferably 15 to 0.5, of multiolefin. The isoolefin, in general, is a $C_4$ to $C_7$ compound, e.g., isobutylene or 2-methyl-1-butene. The multiolefin, in general is a $C_4$ to $C_{10}$ conjugated diolefin, e.g., isoprene, butadiene, or piperylene. The preferred polymer is obtained by reacting 95 to 99.5% by weight of isobutylene with 0.5 to 5% by weight of isoprene. Mixture of monomers, preferably with 1 to 5 volumes of inert diluent, e.g., methyl chloride, should be cooled to a temperature between 0° and —200° C., and it is preferred that the temperature range be between —60° and —130° C. The cold mixture is polymerized by the addition of a Friedel-Crafts catalyst, preferably an aluminum halide catalyst in a liquid or dissolved form, in conjunction with vigorous agitation. The amount of catalyst is generally about 0.15 to 1.0% by weight of the mixed olefins. The polymerization reaction is rapid and the polymer precipitates out of the solution in the form of a slurry or flocculent white solid. The polymer, which is recovered and dried, has a Staudinger molecular weight between 20,000 and 150,000, preferably 45,000 to 60,000; and an iodine number between 0.5 and 50, preferably between 1 and 15. The preparation of this copolymer is described in U.S. Patent No. 2,356,128 which is incorporated herein by reference.

The butyl rubber heretofore described can be halogenated by a substitution reaction to incorporate at least 0.5 weight percent, preferably about 1.0 weight percent, of combined halogen but not more than "X" weight percent fluorine or chlorine, or not more than about 3 "X" weight percent combined bromine or iodine therein, in accordance with the following equation:

$$X = \frac{M_3 L}{(100-L)M_1 + L(M_2+M_3)} \times 100$$

wherein $L$ = mole percent of the multiolefin in the polymer
$M_1$ = molecular weight of the isoolefin
$M_2$ = molecular weight of the multiolefin
$M_3$ = atomic weight of halogen.

In other words, there should be at least about 0.5 weight percent of combined halogen in the polymer but not more than about one atom of combined fluorine or chlorine or 3 atoms of combined bromine or iodine per double bond in the polymer. The halogenation is generally conducted between about —50° C. and about 200° C., and preferably between 20° and 50° C.; however, the temperature is dependent upon the particular halogenating agent which is used. The time interval is usually within the range of one minute to several hours, e.g., 3 minutes. The pressure may vary from 0.5 to 400 p.s.i.a.; however, atmospheric pressure is preferred. It is desirable to halogenate the butyl rubber copolymer while it is dissolved in a $C_4$ to $C_{10}$ hydrocarbon, a $C_4$ to $C_{10}$ halogenated hydrocarbon, carbon tetrachloride, chloroform, hexane, benzene and/or chlorobenzene. Suitable halogenating agents which may be employed are gaseous chlorine, liquid bromine, iodine monochloride, hydrogen fluoride, alkali metal hypobromites or hypochlorides, sulfur bromides or chlorides, bromo or chlorohydantoins, N-bromosuccinimide, and other common halogenating agents. The resulting halogenated butyl rubber polymer may be recovered by precipitating with an alcohol, acetone or any other non-solvent, and subsequently drying at a temperature between 0° and 180° C. within a pressure range from 1 to 760 mm. of Hg. Other methods for recovering the halogenated butyl rubber polymer from the hydrocarbon solution are conventional spray and drum drying techniques. Alternatively, the solution with the halogenated rubbery polymer therein can be injected into a vessel which contains steam and/or agitated hot water. The temperature must be high enough to flash off the solvent whereby an aqueous slurry halogenated butyl rubber is formed therefrom. The halogenated butyl rubber is subsequently separated from this slurry by filtration. After a drying step, the polymer is recovered as a "crumb," a dense sheet, or a slab, depending upon the milling and extruding procedures which are used. The halogenated copolymer generally has a viscosity average molecular weight between about 50,000 and 4,000,000. The mole percent unsaturation is usually between 0.5 and 15.0, preferably 0.6 and 5.0. This halogenated butyl rubber can be compounded and cured to provide a vulcanizate therefrom. It is unreclaimed comminuted scrap of this halogenated butyl rubber vulcanizate that is employed in the instant process.

In accordance with this invention, the butyl rubber copolymer is mixed with unreclaimed comminuted vulcanized halogenated butyly rubber scrap which can also be referred so as "used" halogenated butyl. This used halogenated butyl rubber vulcanizate is generally employed within the range of 5 to 95 parts, preferably 10 to 50 parts per 100 parts by weight of unvulcanized butyl rubber.

The rubbery copolymer of an isoolefin with a multiolefin with the scrap halogenated butyl rubber therein can be compounded with various other materials. Types of materials which can be incorporated are as follows: stabilizers, plasticizers, fillers, accelerators, softeners, catalysts, and crosslinking agents. The usual curing agents are 0.5 to 3 parts of sulfur; 0.5 to 5 parts of accelerators, e.g., tetramethyl thiuram disulfide, 2-mercapto-benzothiazyl, benzothiazyl disulfide, bis-4-ethyl thiazyl disulfide, diphenyl guanidine, butroaldehyde aniline products, zinc dimethyl dithiocarbamate, thiazyl guanidine and aldehydeamines. Other compounding agents which may be incorporated into the rubbery mixture include non-sulfur curing agents such as p-nitroso benzene, p-quinone dioxime, and thiuram disulfide; anti-oxidants and stabilizers, e.g., stearic acid; zinc oxide; pigments and/or dyes; processing aids, e.g., waxes, resins, and/or oils; extenders, e.g., non-volatile mineral oils and/or esters. This compounding may be accomplished by subjecting the rubber to a severe mixing treatment in a Banbury mill at a temperature range of 75° to 500° F. This drastic treatment homogenzies the polymer and removes foci of impurities. Some compounding agents may be added during the working on this mill. The treated polymer can then be worked on open-roll mills with the addition of other compounding ingredients. Mineral fillers, e.g., hydrated silica and carbon black as well as promoters, e.g., p-dinitrosobenzene (Polyac) can also be advantageously employed in the compounding procedure.

After the curing agents, compounding agents, and the unreclaimed comminuted vulcanized halogenated butyl rubber scrap have been incorporated into the butyl rubber polymer, the admixture therefrom is extruded and/or molded into any desired shape and subsequently cured at a temperature of 290° to 330° F. for 60 to 10 minutes to provide a vulcanizate therefrom.

Thus, in accordance with this invention, it is now possible to obtain a vulcanizate which has a relatively high resistance to wearing. In fact, the loss based upon the Lambourne Abrasion measurement is below 1.000 cc./km., and preferably within the range of 0.883 to 0.780. This new product can be utilized on a tire structure, e.g., as a tire tread, to provide a rubbery tire with improved wearing resistance.

This invention may be understood from the following description in conjunction with the accompanying drawing in which FIGURE 1 is a cross-sectional view in perspective of a pneumatic tubeless tire employing therein the butyl rubber of the present invention, wherein the tire is depicted as being mounted on a conventional tubeless type of tire wheel rim. The pneumatic tubeless tire comprises a hollow toroidal-type member which is substantially U-shaped in cross-section by virtue of an open portion which extends around the inner periphery of the member. In other words, the member is of a tubular-type structure which has a cross-section in the form of an open-bellied body with spaced terminal portions to define a member generally resembling a horseshoe wherein the open portion of the horseshoe-shaped member faces toward the interior circumference of said member. The terminal portions constitute the bead portions 11—11 of the tire, inside of which are a plurality of bead wires adhesively imbedded and molded in a rubber. The outer surface of the bead portion is advantageously shaped so as to function as an air-sealing means, such as a plurality of ribs, to aid in adhesion to rim 12 when the tire is inflated. The remaining outer surface of the tire also includes tread area 13 and sidewalls 14. The remaining construction of the tire may vary according to conventional fabrication, but in general the tire is a multi-layered type of structure with an outer layer as above-mentioned. The layer next adjacent the outer layer generally comprises a carcass 15 which includes a rubber, such as butyl rubber, natural rubber, GR-S rubber, etc., which has incorporated therein a fabric composed of a plurality of cotton, rayon, or nylon cords, etc. The tire also includes an inner lining 16, advantageously made from butyl rubber which must be substantially impermeable to air. The lining may also advantageously comprise a rubbery copolymer of about 20–90 wt. percent of a $C_4$—$C_7$ isoolefin, such as isobutylene, and about 1–80 wt. percent of a $C_4$—$C_{14}$ multiolefin, such as isoprene, which has been at least partially vulcanized at least at about 240°–350° F. with from about 0.2–10.0 wt. percent sulfur based on the weight of the copolymer. The above multi-layers, at least three in number, are conventionally bonded and adhered together; for example, by vulcanization to form a tire of a unitary structure. The butyl rubber composition of the present invention, i.e., including a minor proportion of comminuted vulcanized halogenated butyl rubber scrap, may be generally employed throughout the tire, but it is especially desirable in the tread area because of its improved abrasion and/or wear resistance. However, in certain areas of the tire, ordinary butyl rubber is applicable. In one embodiment, a tubeless tire comprises a casing of an outer layer including the tread, sidewall, outer bead portion of a vulcanized mixture of unvulcanized butyl rubber and unreclaimed comminuted vulcanized halogenated butyl rubber scrap. It also comprises an intermediate layer or carcass of ordinary vulcanized butyl rubber, and an inner layer of butyl rubber which has been at least partially vulcanized by heating for about 3–60 minutes or more at about 240°–350° F. with about 0.2–10.0 wt. percent, preferably about 0.5–4.0 wt. percent, sulfur on a basis of the weight of the butyl rubber.

The following example is submitted to illustrate, but not to limit this invention:

EXAMPLE I

A butyl rubber polymer was prepared comprising 97.5 percent of isobutylene with 2.5 percent of isoprene. The reactants were diluted with approximately 5 parts by weight of liquid methyl chloride and cooled to a temperature of about −100° C. A catalytic solution comprising 250 parts by weight of liquid methyl chloride and 2.5 parts by weight of aluminum chloride was then incorporated into the reactant mixture. The polymerization reaction proceeded immediately and rapidly to approximately 100 percent conversion of butyl rubber with a viscosity average molecular weight of 330,000 and 1.5–2.0 mol percent unsaturation. One hundred parts of this copolymer were compounded with various ingredients as listed herebelow:

| Compound: | Parts by weight |
|---|---|
| Butyl Rubber Copolymer | 100 |
| MPC Black [a] | 50 |
| Polyac [b] | 0.5 |
| Stearic Acid | 0.5 |
| Zinc Oxide | 5 |
| Process Oil | 3 |
| Sulfur | 2 |
| Tetra Methyl Thiuram Disulfide | 1 |
| Benzothiazyl Disulfide | 1 |

[a] Medium process channel black.
[b] p-Dinitrosobenzene.

A halogenated butyl rubber vulcanizate was provided comprising 97.5 percent of isobutylene with 2.5 percent of isoprene which has been chemically modified by a substitution-reaction to incorporate about 1.2 percent of halogen, e.g., chlorine, therein. This halogenated copolymer was compounded with 45 parts of SAF black, 5 parts of Necton 60 disclosed in U.S. Patent 2,926,718, 1 part of stearic acid, 3 parts of zinc oxide, 1 part of magnesium oxide, 2 parts of altax (benzothiazole disulfide, disclosed at page 39 Handbook of Material Trade Names, Zimmerman and Lavine, 1953 edition), 1 part of sulfads (dipentamethylene thiuram tetrasulfide, disclosed at page 241 Supplement III Handbook of Material Trade Names, Zimmerman and Lavine, 1953 edition), and 1 part of ledate (lead dimethyl dithiocarbamate, disclosed at page 332 Handbook of Material Trade Names, Zimmerman and Lavine, 1953 edition), and cured at a temperature of 320° F. for 45 minutes. The vulcanizate therefrom was subsequently comminuted by means of a commercial rasp-type buffing machine and the comminuted chlorinated rubber, known in the art as "tire buffings" containing tire shreds and fines and intermediate particles, was mixed with the above compounded rubber in various proportions as indicated in Table I. This admixture of butyl rubber and scrap halogenated butyl rubber was subsequently cured at a temperature of 307° F. for 45 minutes. The physical properties, e.g., abrasion resistance, of the resulting vulcanizate were determined as indicated in Table I.

Table I

|  | A | B | C | D |
|---|---|---|---|---|
| Fresh Base Compound | 100 | 91 | 83 | 75 |
| Base Compound from Halogenated Tread Buffing | | 9 | 17 | 25 |
| Tensiles, p.s.i. | 2,450 | 2,925 | 2,860 | 2,870 |
| Elongation, percent | 360 | 485 | 505 | 540 |
| 300% Modulus, p.s.i. | 2,075 | 1,625 | 1,410 | 1,210 |
| Tear | 330 | 335 | 345 | 400 |
| Shore "A" | 62 | 60 | 57 | 55 |
| Lambourne Abrasion Data: | | | | |
| Loss, cc./km. | 1.222 | 0.883 | 0.789 | 0.780 |
| Rating, percent | 100 | 138 | 154 | 156 |

In the past, the incorporation of scrap butyl rubber, per se, into a compounded butyl rubber increased the abrasion resistance from 3 to 7%. One would expect that the incorporation of a scrap halogenated butyl rubber might have a degrading effect upon the abrasion resistance and even if there were some improvement it would be expected to be within the range for butyl rubber, per se (3 to 7%). This example demonstrates the surprising result of this invention, since the resistance to wearing is increased by 38 to 56%.

Having set forth the general nature and embodiments of the present invention, the true scope is particularly pointed out in the appended claims.

What is claimed is:

1. A process for forming an isoolefin-multiolefin butyl rubber copolymer containing composition of improved abrasion resistance which comprises mixing 100 parts of unvulcanized 70 to 99.5% isoolefin—0.5 to 30% multiolefin butyl rubber copolymer with 5 to 95 parts of unreclaimed comminuted vulcanized 70 to 99.5% isoolefin with 0.5 to 30% multiolefin halogenated butyl rubber copolymer scrap and vulcanizing the resulting composition to produce a composition of increased wear resistance.

2. The process according to claim 1 in which the isoolefin in the butyl rubber copolymer and in the halogenated butyl rubber copolymer scrap is isobutylene and the multiolefin in the butyl rubber and the halogenated butyl rubber scrap is isoprene.

3. The process according to claim 1 in which the halogen in the butyl rubber scrap is selected from the group consisting of bromine and chlorine.

4. The process according to claim 1 in which about 70 to 90 weight percent of unvulcanized isoolefin-multiolefin butyl rubber copolymer is mixed with about 10 to 25 weight percent of unreclaimed comminuted vulcanized isoolefin-multiolefin halogenated butyl rubber copolymer scrap.

5. Vulcanized rubbery polymer composition of improved abrasion resistance comprising the product obtained from vulcanizing about 60-95 wt. percent of an unvulcanized copolymer comprising the reaction product of about 70–99.5 parts by weight of a $C_4$—$C_7$ isoolefin and about 30–0.5 parts by weight of a $C_4$—$C_{14}$ conjugated diolefin with about 5–40 wt. percent of an unreclaimed comminuted vulcanized halogenated copolymer of about 70–99.5 parts by weight of a $C_4$—$C_7$ isoolefin and about 30–0.5 parts by weight of a $C_4$—$C_{14}$ conjugated diolefin.

6. Vulcanizable rubbery polymeric composition comprising about 70–90 wt. percent of an unvulcanized copolymer containing about 90–91 wt. percent isobutylene and about 10–1 wt. percent isoprene with about 10–30 wt. percent of an unreclaimed comminuted vulcanized halogenated copolymer containing about 90–99 wt. percent isobutylene and about 10–1 wt percent isoprene.

7. An isobutylene-diolefin butyl rubber copolymer containing recap for an automobile tire comprising a vulcanized rubbery polymeric composition comprising about 75–90 wt. percent of an unvulcanized copolymer of about 90–99 parts by weight isobutylene and about 10–1 parts by weight of a $C_4$—$C_8$ conjugated diolefin with about 10–21 wt. percent of an unreclaimed comminuted vulcanized halogenated copolymer of about 90–99 parts by weight isobutylene and about 10–1 parts by weight of a $C_4$—$C_8$ conjugated diolefin.

8. In a tire, the combination comprising an open-bellied body terminating in spaced bead portions, air-sealing means at said bead portions, and a tread area intermediate of said bead portions wherein said tread area comprises a vulcanized mixture of 100 parts of unvulcanized 70 to 99.5% isoolefin with 0.5 to 30% multiolefin butyl rubber copolymer and 5 to 95 parts of unreclaimed comminuted vulcanized halogenated 70 to 99.5% isoolefin with 0.5 to 30% multiolefin butyl rubber copolymer scrap.

9. In a tubeless tire, the combination which comprises an open-bellied body terminating in spaced bead portions, said body comprising at least three layers, an inner layer containing a rubber which has been at least partially vulcanized, an intermediate carcass layer including a rubber vulcanizate and a plurality of tire cords embedded in said vulcanizate, and an outer layer including a sidewall and tread area, wherein at least the tread area comprises a vulcanized admixture containing about 70 to 95 weight percent of unvulcanized 70 to 99.5% isoolefin with 0.5 to 30% multiolefin butyl rubber copolymer and about 5 to 30 weight percent of unreclaimed comminuted vulcanized halogenated 70 to 99.5% isoolefin with 0.5 to 30% multiolefin butyl rubber copolymer scrap, the unvulcanized copolymer and the vulcanized comminuted copolymer scrap being of approximately the same composition.

10. The product according to claim 12 in which the halogen in the butyl rubber copolymer scrap is selected from the group consisting of bromine and chlorine.

11. The composition according to claim 12 in which the butyl rubber copolymer contains 85 to 99.5% isobutylene with 0.5 to 15% isoprene, and the unreclaimed comminuted vulcanized halogenated butyl rubber copolymer scrap comprises 85 to 99.5% isobutylene with 0.5 to 15% isoprene.

12. An isoolefin-multiolefin butyl rubber copolymer and copolymer scrap-containing composition which, when vulcanized, exhibits improved abrasion resistance, comprising between 5 and about 95 parts of unreclaimed comminuted vulcanized halogenated butyl rubber copolymer scrap formed from the copolymerization of 70 to 99.5% isoolefin with 0.5 to 30% multiolefin for each 100 parts of unvulcanized butyl rubber copolymer formed from the copolymerization of 70 to 99.5% of isoolefin with 0.5 to 30% of multiolefin.

References Cited in the file of this patent

UNITED STATES PATENTS

| 2,857,357 | Smith | Oct. 21, 1958 |
| 2,884,982 | Sparks et al. | May 5, 1959 |
| 2,926,718 | Baldwin et al. | Mar. 1, 1960 |